US008321915B1

(12) United States Patent
Bartolucci et al.

(10) Patent No.: US 8,321,915 B1
(45) Date of Patent: Nov. 27, 2012

(54) CONTROL OF ACCESS TO MASS STORAGE SYSTEM

(75) Inventors: Guido Enrico Bartolucci, Seattle, WA (US); Manikandan Thangarathnam, Tamil Nadu (IN); Ryan J. Snodgrass, Kirkland, WA (US); Sriram Narasimhan, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 1177 days.

(21) Appl. No.: 12/059,633

(22) Filed: Mar. 31, 2008

Related U.S. Application Data

(60) Provisional application No. 61/032,743, filed on Feb. 29, 2008.

(51) Int. Cl.
*H04L 29/06* (2006.01)
(52) U.S. Cl. ........ 726/4; 726/2; 726/3; 726/21; 709/219; 709/238; 709/215; 709/217; 707/600; 707/705; 707/821; 711/147; 711/148
(58) Field of Classification Search ........................ None
See application file for complete search history.

(56) References Cited

U.S. PATENT DOCUMENTS

| | | | |
|---|---|---|---|
| 6,363,400 B1 * | 3/2002 | Chtchetkine et al. ................. 1/1 |
| 6,886,035 B2 * | 4/2005 | Wolff ............................ 709/219 |
| 7,360,034 B1 * | 4/2008 | Muhlestein et al. ........... 711/148 |
| 7,562,216 B2 * | 7/2009 | Borthakur et al. ............. 713/165 |
| 7,613,724 B1 * | 11/2009 | Santry et al. ........................... 1/1 |
| 7,630,877 B2 * | 12/2009 | Brown et al. ..................... 703/21 |
| 7,653,699 B1 * | 1/2010 | Colgrove et al. .............. 709/213 |
| 7,664,021 B2 * | 2/2010 | Matsushita et al. ........... 370/230 |
| 7,734,597 B2 * | 6/2010 | Edwards ....................... 707/690 |
| 7,783,666 B1 * | 8/2010 | Zhuge et al. .................... 707/783 |
| 7,788,335 B2 * | 8/2010 | Miloushev et al. ........... 709/213 |
| 7,805,468 B2 * | 9/2010 | Takahashi ..................... 707/821 |
| 7,865,873 B1 * | 1/2011 | Zoellner et al. ............... 717/110 |
| 8,095,969 B2 * | 1/2012 | Dillaway et al. .................... 726/6 |
| 8,122,464 B2 * | 2/2012 | Ramaswamy et al. .......... 725/16 |
| 8,190,741 B2 * | 5/2012 | Wong et al. .................... 709/226 |
| 8,201,215 B2 * | 6/2012 | Dillaway et al. ................... 726/2 |
| 2003/0046366 A1 * | 3/2003 | Pardikar et al. ............... 709/219 |
| 2004/0064721 A1 * | 4/2004 | Murching et al. ............. 713/200 |
| 2004/0133570 A1 * | 7/2004 | Soltis .................................. 707/3 |
| 2004/0158582 A1 * | 8/2004 | Takagi et al. .............. 707/104.1 |
| 2005/0240553 A1 * | 10/2005 | Diggs et al. ....................... 707/1 |
| 2005/0251522 A1 * | 11/2005 | Clark ............................ 707/100 |
| 2006/0206510 A1 * | 9/2006 | Moulhaud et al. ............ 707/101 |
| 2007/0088702 A1 * | 4/2007 | Fridella et al. ................. 707/10 |
| 2008/0040816 A1 * | 2/2008 | Manning et al. ................ 726/31 |
| 2008/0235394 A1 * | 9/2008 | Olive ............................. 709/238 |
| 2009/0150332 A1 * | 6/2009 | Zhuang et al. ..................... 707/1 |

* cited by examiner

*Primary Examiner* — Syed A. Zia
(74) *Attorney, Agent, or Firm* — Thomas | Horstemeyer, LLP

(57) ABSTRACT

Disclosed are various systems, methods, and other embodiments for the control of access to a mass storage system. In one example, a plurality of buckets are maintained in mass storage system, each of the buckets being employed to store at least one data file. In a server, a use of the buckets by a plurality of entities that use a plurality of clients is facilitated for the storage of a plurality of files over a public network. The use of one of the buckets by the one of the entities is restricted to a namespace.

23 Claims, 5 Drawing Sheets

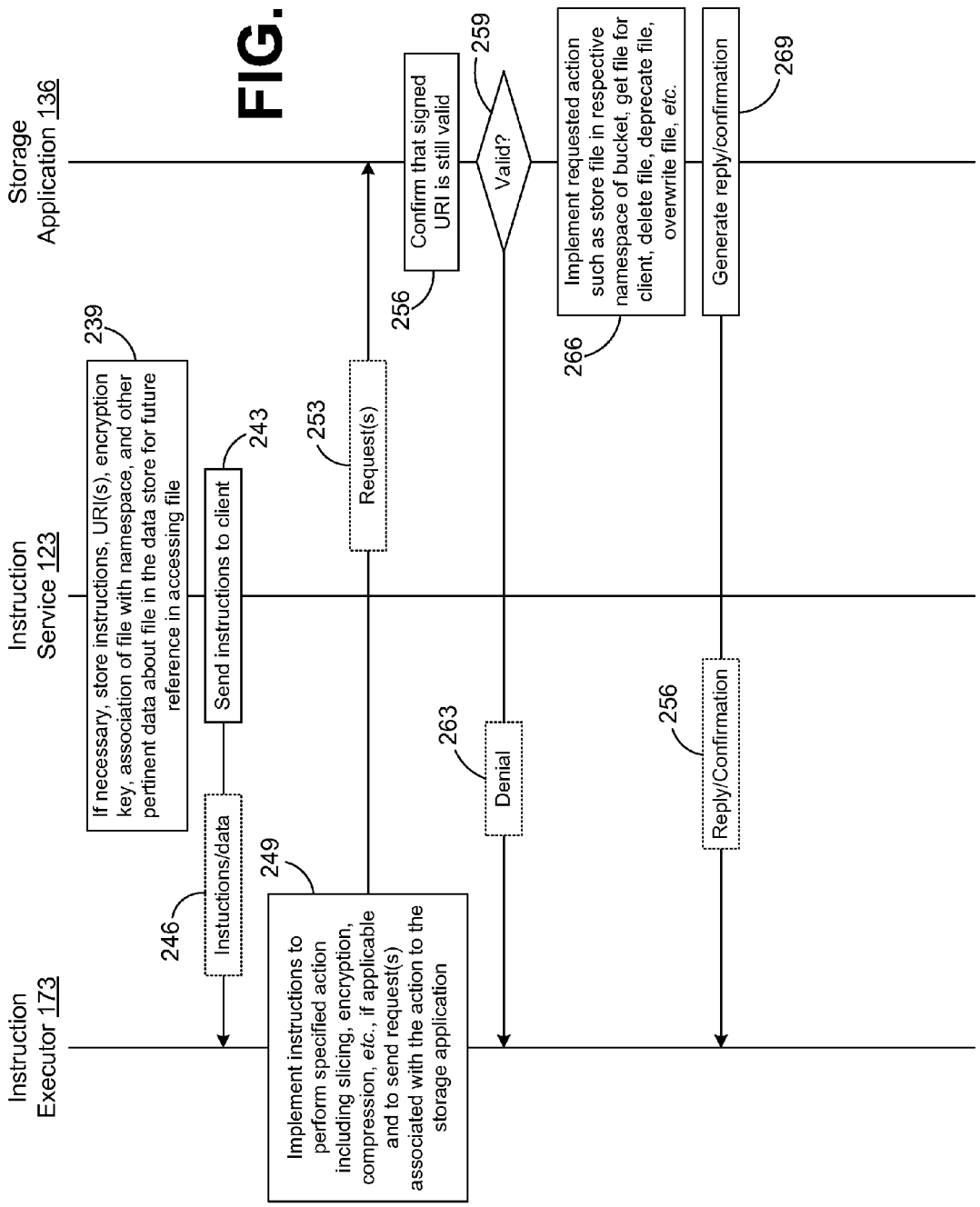

CONTROL OF ACCESS TO MASS STORAGE SYSTEM

CROSS REFERENCE TO RELATED APPLICATIONS

This Application claims priority to co-pending U.S. Provisional Patent Application entitled "CONTROL OF ACCESS TO MASS STORAGE SYSTEM" filed on Feb. 29, 2008 and assigned application No. 61/032,743, which is incorporated herein by reference in its entirety. Also, this application is related to co-pending U.S. patent application entitled "SECURE TRANSFER OF FILES" filed on even day herewith and assigned application Ser. No. 12/059,588.

BACKGROUND

Mass storage systems have appeared in which users can store massive amounts of data for a fee. Such mass storage systems facilitate the creation of various applications on the Internet that require such data storage. One drawback for large scale mass storage systems that are made available to multiple customers for a fee revolves around securing data and limiting access to such data to appropriate clients. Specifically, one customer that stores data may wish to provide access to select parts of the data to select clients. Also, such a customer would not want unauthorized clients to access such data, nor would the customer care to have access to the data of a third party. This is especially the case given that the data stored by a given individual may be critical data that cannot be exposed to unauthorized third parties.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 3A-3B are a flow diagram of one example of the operation of various components of the file transfer and storage network of FIG. 1 according to an embodiment of the present disclosure;

DETAILED DESCRIPTION

Figure 1:
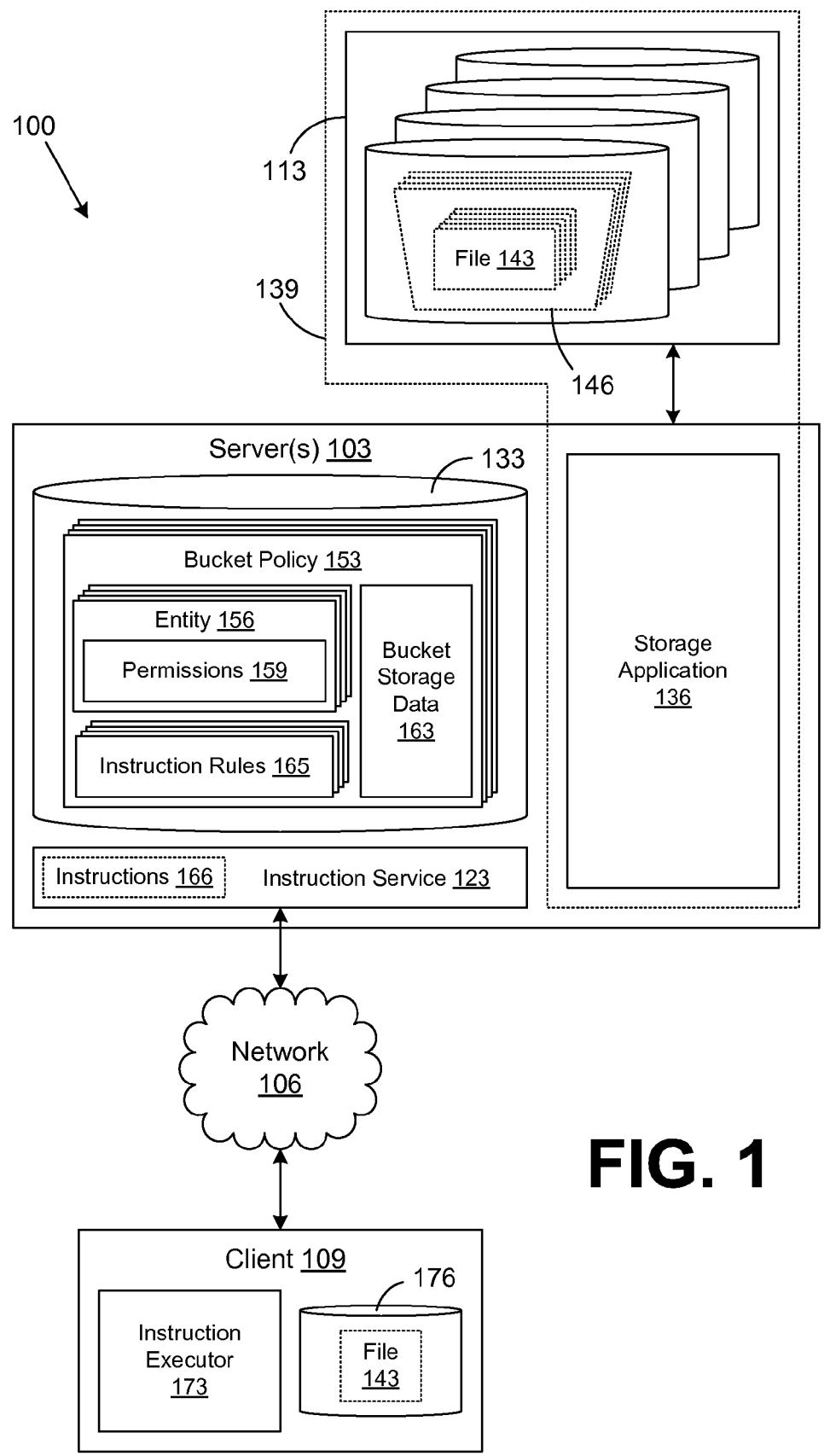
FIG. 1 is a block diagram of a file transfer and storage network according to various embodiments of the present disclosure.

With reference to FIG. 1, shown is an example of a transfer and storage network 100 according to various embodiments of the present disclosure. The transfer and storage network 100 includes one or more servers 103 that are coupled to a network 106. A client 109 is also coupled to the network 106. The server 103 may comprise a single server or multiple servers as can be appreciated. Likewise, the client 109 is representative of many different clients that may be coupled to the network 106. The network 106 may comprise, for example, the Internet, intranets, wide area networks (WANs), local area networks, wireless networks, or other suitable networks, etc., or any combination of two or more such networks.

The server 103 may comprise, for example, a server computer, a processor-based device, or other device with like capability that performs the operations of a server 103. The client 109 may comprise, for example, a computer system such as a desktop, laptop, personal digital assistant, portable computing device, or other device with like capabilities.

The server 103 is in data communication with mass storage 113. In this respect, the server 103 may be coupled to the mass storage 113 by way of a network or other data link as can be appreciated. The mass storage 113 may comprise a bank of storage devices, or multiple banks of storage devices. Such storage device may comprise, for example, hard drives, tape drives, or other storage devices that can serve to hold large amounts of data. Such storage devices are typical of those used for the performance of various functions of various entities on the Internet such as, for example, an online merchant who sells goods over the Internet, etc.

There are several components that are either stored and/or executed on the server 103 according to the various embodiments of the present disclosure. Specifically, such components may include, for example, an instruction service 123. The components in the server 103 also include a data store 133 that is used to store various data in coordination with the operation of the instruction service 123 and other services and/or applications on the server 103.

The server 103 also includes a storage application 136 that is executed on the server 103 in order to facilitate the storage of and access to files 143 in the mass storage 113. Together, the mass storage 113 and the storage application 136 comprise a mass storage system 139 according to various embodiments.

In addition, although the instruction service 123, data store 133, storage application 136 are shown as being executed on the same server 103 in FIG. 1, it is understood that these systems may be executed on entirely different servers 103.

In addition, there may be other components executed in the server 103 such as appropriate server applications such as Web servers or like applications that facilitate communication between the various components on the server 103 and the client 109. For example, various application programming interfaces (APIs) may be employed for such purposes as can be appreciated.

The storage application 136 is executed in the server 103 to facilitate or control storage and access to a number of files 143 maintained in the mass storage 113. The mass storage 113 organizes the storage of the files 143 using so-called "buckets" 146. The buckets 146 comprise an abstraction that defines storage units within the mass storage 113 that are used to organize the storage of files 143. The files 143 may comprise, for example, digital files that include content items such as, for example, video content (i.e., movies, videos, and the like), audio content (i.e., songs and the like), or other data as can be appreciated.

It may be the case that a given bucket 146 may include a single file 143. Alternatively, there may be many files 143 contained in or associated with a given bucket 146. Access to the data represented by the files 143 on the part of clients 109 is restricted based upon allowable access to respective ones of the buckets 146. In particular, according to one embodiment, access to the data stored in the mass storage 113 depends upon access that a given client 109 has to one or more buckets 146.

The storage application 136 is executed in the server 103 in order to control access to the mass storage 113. To this end, the storage application 136 may cause files 143 to be stored in various buckets 146. Also, the storage application 136 controls whether files 143 may be accessed by various clients 109. Further, the storage application 136 controls whether files 143 may be overwritten, deleted, or deprecated (i.e. marked for deletion or other status) based upon the actions of clients 109. In addition, there may be many other functions performed by the storage application 136 that are not described herein in detail.

Stored within data store 133 are a plurality of bucket policies 153 according to various embodiments. Each bucket policy 153 is associated with a given one of the buckets 146 in the mass storage 113. The bucket policy 153 includes information such as, for example, a bucket identification and administrator credentials of an entity that can control access to the bucket 146 through the storage application 136 as will be described. The term "entity" as employed herein may comprise individuals, groups of individuals, organizations, corporations, or other types of entities.

Associated with each bucket policy 153 are one or more entities 156. Associated with each entity 156 is at least one certificate or other type of identification that uniquely identifies the entity 156. In one embodiment, each certificate is associated with a single one of the buckets 146. Thus, if a given entity needs access to multiple buckets 146, they would receive multiple corresponding certificates. Also associated with each entity 156 in a given bucket policy 153 are a number of permissions 159 that govern access by the entity 156 to the contents of a given bucket 146 in the mass storage 113. According to one embodiment, the permissions 159 are organized according to namespaces maintained with respect to the buckets 146.

Associated with each bucket policy 153 are instruction rules 165 from which instructions 166 are generated. The instruction rules 165 comprise information that may be employed by the instruction service 123 to generate instructions 166 that are sent to the client 109 to cause the client 109 to perform a desired function with respect to a given one of the buckets 146.

Also associated with each bucket policy 153 is bucket storage data 163 includes information about all of the files 143 stored in the corresponding bucket 146. Such information may include instructions previously sent to a client 109 to direct a client 109 to initially store a file 146 in the data storage system 139 so that the file 143 can be accessed at a later time as will be described.

Each of the instruction rules 165 of each bucket policy 153 includes information from which the instructions 166 are generated that are used to perform the various functions with respect to the respective bucket 146. For example, a rule may specify that all files 143 to be stored in the mass storage system 139 that comprise video content shall be sliced into component files that are one megabyte or less in size. Accordingly, assuming that the instruction service 123 receives a request to store a video file, the instruction service 123 will generate an instruction 166 to the respective client to slice the file into 1 megabyte component files. There are many other types of instruction rules 165 that may be employed.

The instruction rules 165 represented are unique with respect to each other. Thus, in order to generate the instructions 166 to direct a client 109 to perform any one of a number of different functions or tasks as will be described, various combinations of the instruction rules 165 may be consulted depending upon the function to be performed. That is to say, instructions 166 for each function or task are generated based upon various respective combinations of the rules 165. Ultimately, the storage of the instruction rules 165 in the bucket policies 153 allows operators of the servers 103 to control how clients 109 access or use various buckets 146 in the mass storage 113. Specifically, this allows the operators to change the instructions generated over time to control the operation of the clients 109 as desired by changing the instruction rules 165 from which the instructions 166 are generated. Note that when instructions 166 are generated to send to a client 109 to facilitate the performance of a requested action, the instructions 166 sent are saved in the bucket storage data 163 and are immutable. This ensures that the instruction service 123 can determine how the files 143 were saved in the future to facilitate future access.

The client 109 is employed to execute and store various components according to the various embodiments. Specifically, the client 109 includes an instruction executor 173 that is executed in the client 109 to implement instructions 166 received from the server 103 to perform data storage and other functions with respect to one of the buckets 146. According to one embodiment, the client 109 also includes a data store 176 in which a file 143 may be disposed that is to be uploaded and stored, for example, in a given bucket 146.

In one embodiment, the instruction executor 173 is a "lightweight" client application in that it is only capable of implementing instructions 166 provided to it from the server 103 as will be described. To this end, the client 109 is manipulated by an entity to perform various functions with respect to the buckets 146 such as get (read), put (store or write), delete, overwrite, and/or other functions.

In another embodiment, the instruction server 123 may be implemented as a service executed in the client 109 that may or may not be within the same process as the instruction executor 173. Accordingly, the data store 133 may be included in, or be accessible to the client 109.

Next, a general discussion of the operation of the various components of the transfer and storage network 100 is provided according to various embodiments. According to one embodiment, the instruction executor 173 is a "lightweight" application that essentially executes the instructions 166 received from the instruction service 123. This provides one advantage in that the interaction between the client 109 and the mass storage system 139 is controlled at the server 103. Such interaction is controlled by specifying the instruction rules 165 stored in the bucket policies 153 from which the instructions 166 are generated. This advantageously eliminates the need to update the instruction executor 173 at the clients 109 in order to change the interaction between clients 109 and the mass storage system 139.

To begin, assume, for example, that the client 109 has a file 143 in the data store 176 that the client 109 wishes to transfer to an appropriate bucket 146 of the mass storage 113 over the network 106. Also assume that the file 143 is quite valuable and susceptible to attempts at interception by malicious entities on the network 106. In this respect, the network 106 may comprise, for example, a public network such as the Internet or other public network as can be appreciated. In order to begin to transfer the file 143 to the mass storage 113, the client 109 generates a request that is transmitted to the server 103 that includes, for example, an entity certificate, an action to perform (in this case a PUT action), a filename of the file 143 to store, the size of the file 143 to be stored, and any other pertinent information. Alternatively, it may be that other items are included in the request, or that some of the items listed above may be omitted.

Upon receiving the request, a server application such as, for example, a web server or other appropriate server application executed in the server 103 forwards entity information to an appropriate application to authenticate the entity. In one embodiment, this authentication may be performed by the instruction service 123 or other application. As contemplated herein, data is "received" by a device or system when the data such as the instructions 166 is accessible by the device or system such that the device or system can act upon it as can be appreciated. Assuming the entity is authenticated, then the server application may forward the request to the instruction service 123.

The instruction service 123 then determines whether the entity indicated in the request is authorized to transfer the file 143 from the client 109 to the mass storage system 139 over the network 106. In order to do so, the instruction service 123 or other component of the server 103 may search through the various bucket policies 153 in the data store 133 to see if the respective entity 156 indicated in the request is also listed in one of the bucket policies 153. Specifically, the certificate included in the request identifies both the entity 156 and the bucket 146 to which it pertains. Thus, upon receiving the request, based on the certificate of the entity 156 in the request, the instruction service 123 can look up the corresponding bucket policy 153 of the respective bucket 146. Once the entity 156 is located in a bucket policy 153, then the instruction service 123 can identify the namespace associated with the entity 156, and the permissions 159 for the use of the namespace of the respective bucket 146 for the entity 156.

Assuming that the permissions 159 allow the client 109 to transfer the file 143, the instruction service 123 then proceeds to generate an appropriate set of instructions 166 based upon the relevant instruction rules 165 associated with the bucket policy 153 to send to the client 109 to implement the transfer. The instruction rules 165 from which the instructions 166 are generated may be identified based upon the information provided by the client 109 in the request. Such information may comprise, for example, the size and type of file 143 to be transferred, etc.

Once the instructions 166 are generated, they are sent to the client 109 for execution. Such instructions 166 are configured to control the activity of the client 109 in transferring the file 143 from the client 109 to the mass storage system 139 over the network 106.

As mentioned above, the instruction executor 173 is a lightweight application with a primary function of implementing the instructions 166 received from the server 103. Stated another way, the instruction executor 173 is configured to execute instructions 166 from the server 103 and not to perform functions independently. The instruction service 123 sends the instructions 166 to the client 109 in order to implement the transfer of the file 143 from the client 109 to the mass storage system 139.

The instructions 166 applied to the client 109 may indicate various actions that are to be performed with respect to the file 143 to effect the transfer of the file 143 to the mass storage system 139. For example, the instructions 166 may indicate that the file 143 is to be sliced into a plurality of component files. This may be required where the file size is greater than a maximum file size limit for the mass storage system 139. That is to say, the mass storage system 139 may be designed to receive only files that are smaller than a predefined maximum file size limit.

The component files that result from the act of slicing the file 143 fall below the maximum file size limit of the mass storage system 139. The instructions 166 may also direct the encryption of the file 143 or each of the component files according to a predefined encryption algorithm. To this end, the instruction service 123 may also send one or more encryption keys to the client 109 to be used by the client 109 to encrypt the file 143 or component files.

Also, the instructions 166 may direct the compression of the file 143 or component files according to a predefined compression algorithm. Still further, the instructions 166 may specify how the instruction executor 173 is to throttle the rate of requests that are submitted to the mass storage system 136 such as may be the case, for example, where a file 143 is sliced into multiple component files that are transmitted to the mass storage system 136 in requests for storage, etc. By controlling the rate at which the requests are transmitted, the instructions 166 generated by the instruction service 123 may control the rate at which such requests are received by the storage application 136 to make sure it can handle the load. The instructions 166 may also specify how digital rights management (DRM) is to be applied to the file 143 as it is read from the mass storage system 136.

Ultimately, the client 109 executes the instructions 166 to transfer the file 143, or the component files resulting from a slicing of the file 143, to the mass storage system 139 to be stored in one or more buckets 146 based upon the permissions 159 provided to the entity 156. Where component files are sent, they are sent individually and handled by the storage application 136 as separate files. Specifically, the storage application does not know anything about how various files may be related, its primary function is for storage. Effectively, according to one embodiment, the tracking of how files are related is performed by the instruction service 123.

When the instructions 166 are sent to the client 109 to implement the transfer of the file 143 from the client 109 to the mass storage system 139, the instruction service 123 also limits the time in which the client 109 can implement the transfer. In order to do this, the instruction service 123 provides credentials to the client 109 that are in turn sent back to the server 103 in connection with the transfer of the file 143 to allow the storage application 136 to determine whether the time limit imposed upon the transfer to be performed by the client 109 has passed.

According to one embodiment, the credentials employed comprise a signed universal resource identifier (URI) which indicates a location in the mass storage 113 where the file 143 is to be stored. Also, the URI is signed such that it can be employed to indicate whether the time period specified for the transfer has expired. Such a URI may be associated with a given bucket 146. By signing the URI, a token or other component is added to the URI that is used by the storage application 136 to determine whether the time period within which the requested action is to occur has expired. In one alternative, the token may be encrypted to prevent interference by nefarious third parties. Also, the entire URI and token may be encrypted such that the client 109 has no knowledge of the actual location of the file 143 within the mass storage 113. This also prevents third parties from intercepting such information. In any event, the signed URI is stored in the server 103 to be used to track the time period within which the transfer of the file 143 is to take place. Specifically, when the URI is received from the client 109 with the file 143 to be stored, the storage application 136 can determine whether the time period has expired based upon the time that the URI was originally signed. Alternatively, the URI may be specified such that the time bound credentials may be extracted from the URI itself rather than requiring the URI to be stored in the server 103.

In an alternative, the credentials used to allow the storage application 136 to determine whether the time limit imposed upon the transfer to be performed by the client 109 has passed may involve the use of "one-time use" URIs. In this respect, the storage application 136 may be configured to allow a given URI to be used only once. Where error occurs during use of such a URI such as during the transfer of a file 143 from a client 109 to the mass storage system 139, a new one-time use URI may be issued by the instruction service 123 at the request of the client 109.

According to one embodiment, the signed URI is sent to the client 109 along with the instructions 166 sent by the instruction service 123. The actual URI sent may be generated for each file 143 or component file to be stored by the instruction service 123 based upon a URI associated with the respective bucket 146 indicated in the bucket policy 153. As an additional alternative, the credentials sent to the client 109 to be passed to the storage application 136 to track whether the time period has expired may comprise a token or other data that is not appended to the URI that is passed to the storage application 136 with the URI indicating the location of a file 143 to be stored or accessed. However, for purposes of this description, where the discussion refers a time limited signed URI, it is understood that some other alternative credential may also be used in order to track whether a time period has expired within which to perform the desired action.

Note that where a file 143 is to be sliced into multiple component files as it is larger than a maximum file size limit of the mass storage system 139, according to one embodiment, the instruction service 123 sends a time limited signed URI for each component file that is separately transmitted to the mass storage system 139. The number of URIs that need to be sent to the client 109 with the instructions 166 may be calculated based upon the size of the file 143 indicated in the original request from the client 109 as described above. The instructions 166 sent to the client 106 guide the activity of the instruction executor 173 in the client 109 in transmitting the multiple component files to the storage application 136 of the mass storage service 139.

In addition, in various embodiments, the instruction service 123 and the storage application 136 facilitate the use of the buckets 146 by a plurality of the clients 109 for the storage of files 143 to provide access to such files 143 over the network 106 as described above. Also, the instruction service 123 ultimately restricts the use of the buckets 146 by respective ones of the clients 109 to specific namespaces. In particular, associated with each of the buckets 146 may be one or more namespaces that serve as categories for the storage of respective files 143 or component files. In one embodiment, each of the files 143 or component file stored in a respective bucket 146 is associated with a given one of the namespaces associated with the bucket 146.

There may be many ways that access by a client 109 to files 143 within a given bucket 146 may be controlled. For example, a given client 109 may be given access to all of the files 143 in a given bucket 146. Alternatively, a client 109 may be given access to only some of the files 143 within a given bucket 146. Of course, this assumes that there are multiple files 143 within a respective bucket 146.

In order to restrict access to some of the files 143 within a given bucket 146, one or more namespaces may be associated with each of the buckets 146 in a given bucket policy 153. Respective ones of the files 143 may be associated with a given one of the namespaces associated with a given bucket 146. In order to restrict the use of one of the buckets 146 by one of the clients 109 to a given one of the namespaces, the entities 156 listed in the bucket policy 153 for a respective bucket 146 are associated with one or more namespaces to which such entities 156 may have access.

Associated with each namespace for each entity 156 in a bucket policy 153 are permissions 159. The permissions 159 may vary from namespace to namespace for a given entity 156. For a given namespace, there can be any number of permissions 159 that specify which actions an entity 156 may take with respect to the namespace of the bucket 146. To this end, after an entity 156 is authenticated by the instruction service 123 based upon the credentials received in a request from the client 109, the instructions service 123 determines whether the entity 156 is authorized to perform the requested action by determining what permissions 159 a given client 109 has with respect to a given namespace of a respective bucket 146 as set forth in a respective bucket policy 153.

Once the entity 156 is verified as having permissions 159 for access to a respective namespace of a given bucket 146, then the instruction service 123 generates and sends appropriate instructions 166 to the client 109. Also, the time limited signed URI(s) and encryption key(s) are sent to the client 109 along with the instructions 166 as described above.

The permissions 159 associated with a given entity 156 in the data store 133 govern the use of a namespace of a respective bucket 146 by the client 109. For example, the permissions 159 may indicate whether the client 109 is allowed to put a file 143 into the namespace of a respective one of the buckets 146. Also, the permissions 159 may indicate whether the client 109 is allowed to get or read a file 143 from a given namespace in a bucket 146. Also, a permission 159 may indicate whether the client 109 is allowed to delete a file 143 from, or overwrite a file 143 in a given namespace of one of the buckets 146. The signed URI allows the instruction service 123 to limit the use of a respective namespace of one of the buckets 146 to a limited period of time as was described above.

Figure 2:
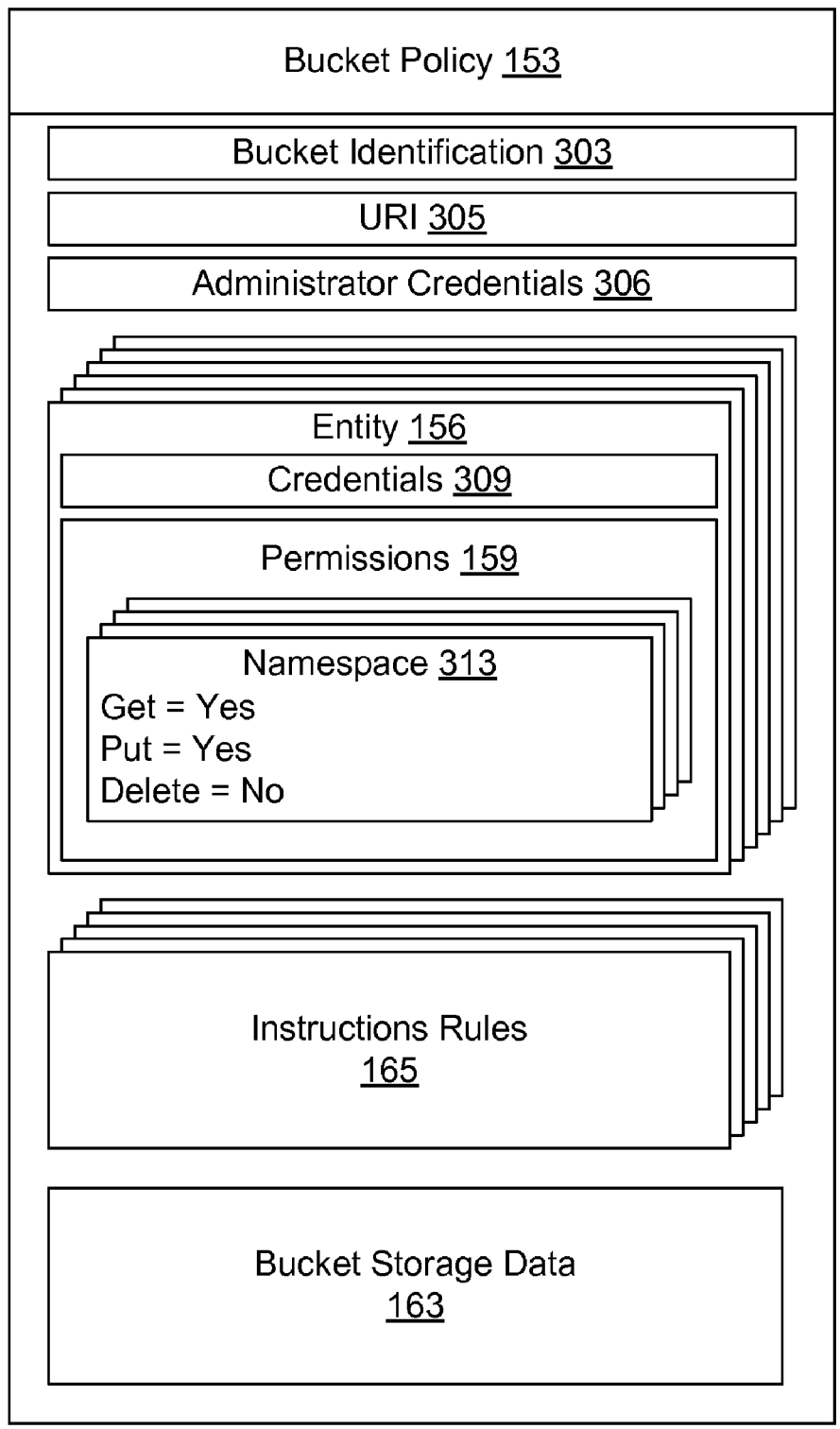
FIG. 2 is a drawing that illustrates one example of a policy data structure stored in association with a server in the file transfer and storage network of FIG. 1 according to an embodiment of the present disclosure.

With reference to FIG. 2, shown is one example of a bucket policy 153 according to various embodiments of the present disclosure. The bucket policy 153 is associated with a respective one of the buckets 146 (FIG. 1) and controls the use of or access to namespaces 313 associated with one of the buckets 146 by virtue of the permissions 159 described above.

The bucket policy 153 includes a bucket identification 303 that identifies the bucket 146 in the mass storage 113 (FIG. 1) that is associated with the bucket policy 153. Also, the bucket policy 153 includes a universal resource indicator (URI) 305 that is used in storing files 143 or component files to a corresponding bucket 146. To this end, the URI 305 may comprise a file location to which further file extensions are applied for individual files 143 stored therein.

Also, the bucket policy 153 includes administrator credentials 306 such as an administrator certificate. The administrator credentials 306 are associated with an entity that has administrator rights with respect to the bucket policy 153. Once authenticated, various user interfaces may be presented through which an entity may add or delete entities 156 from the bucket policy 153. Also, an administrator may change the namespaces 313 associated with an entity 156, or may change permissions 159 associated with the namespaces 313 of respective entities 156 for a bucket 146. In this respect, the entity 156 associated with the administrator credentials 306 has the ultimate control over the use of, and access to, the respective bucket 146 in the mass storage 113.

The bucket policy 153 also includes a listing of entities 156. Associated with each entity 156 are the credentials 309. The credentials 309 may comprise, for example, an entity identifier, password, certificate, public key, or other information that may be employed to verify that the entity 156 has access to the functionality of the instruction service 123 (FIG. 1) as described above. In one embodiment, the credentials 309 comprise the certificate associated with a respective entity 156 as described above.

Also, associated with each entity 156 are permissions 159. The permissions 159 are organized according to namespaces 313. In particular, a given entity 156 may have permissions 159 relating to multiple namespaces 313 with respect to a given bucket 146. The permissions 159 associated with a given namespace 313 may involve authorization to get, put, delete, overwrite, and/or other authorizations as can be appreciated. By associating the respective namespaces 313 with a given entity 156, the instruction service 123 may identify those namespaces 313 that the entity 156 may use or access within the bucket 146.

The bucket policy 153 further includes the instruction rules 165 from which instructions 166 are generated that may be sent to the clients 109 to direct their activity in performing various functions with respect to a given bucket 146 as described above. Also, the bucket storage data 163 is associated with the bucket policy 153 and includes information about files 143 or component files that are already stored in the bucket 146. Specifically, the instructions 166 used to store such files as well as the URIs associated with such files 143 are included so that such files may be accessed in the future, etc.

Figure 3A:
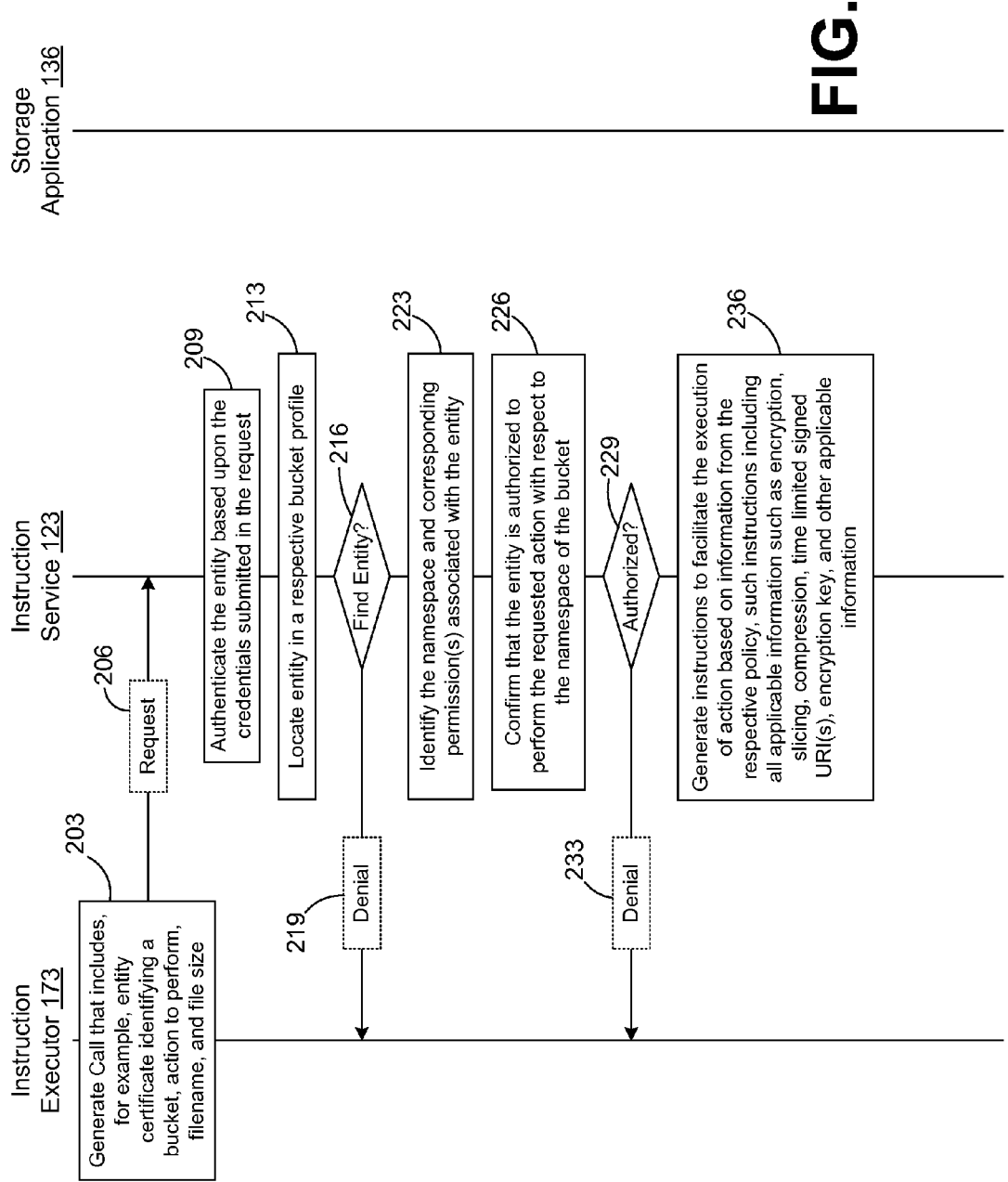

Next, reference is made to FIGS. 3A and 3B that depict a flow diagram of the functionality of the various entities or devices in the transfer and storage network 100 (FIG. 1) in performing various tasks such as a transfer of a file 143 (FIG. 1) from a client 109 (FIG. 1) into the mass storage system 139 (FIG. 1) as described above. Alternatively, the flow diagram of FIGS. 3A and 3B may be viewed as depicting steps of a method implemented in the various entities or devices in the transfer and storage network 100 according to various embodiments.

Beginning with box 203, the instruction executor 173 in the client 109 generates a request that includes, for example, the entity certificate, an action to perform, and a filename or other identifier of a file 143 that is the subject of the action to perform, and the file size of the file 143. Also, information may be included that facilitates an authentication of the entity generating the request. The entity certificate may be used for this purpose. Also, the entity certificate provides information that allows the instruction service 123 to locate the appropriate bucket 146 with information to verify that the requesting entity has the authority to perform the requested action as described above. Further, it may be the case that more or less information is included in the request that is described above. For example, it may not be necessary to include the file size where the action to perform does not involve a PUT action in which a file 143 is to be stored in the mass storage system 139.

Once generated, the instruction executor 173 transmits the request 206 to the server 103. An appropriate application in the server 103 such as a server application or web server receives the request and forwards the request to the instruction service 123 for processing.

The data from the request 206 received from the client 109 is also forwarded to the instruction service 123. In box 209, the instruction service 209 authenticates the entity indicated in the request to prevent unauthorized access to the system. Then, in box 213, the instruction service 123 determines whether the entity exists in the bucket policy 153 (FIG. 1) associated with the certificate included in the request. In this respect, each certificate is associated with a respective one of the buckets 146. In box 216, if the entity is not listed in the respective bucket policy 153, then a service denial 219 is issued to the client 109. This may be the case where the administrator of a given bucket policy 153 removes the entity from the bucket policy 153.

Assuming in box 216 that the entity is listed in the bucket policy 153, then in box 223 the instruction service 123 identifies the namespace 313 and the permissions 159 associated therewith for the entity 156. In one embodiment, there may be only a single namespace 313 per entity 156. Alternatively, there may be more than one namespace 313 per entity 156. Based on the namespace 313 and permissions 159 listed, in box 226 the instruction service 123 verifies that the entity is authorized to perform the requested action with respect to the namespace 313 of the respective bucket 146.

In box 229, if the entity 156 is not authorized, then the instruction service 123 issues a denial of service 233 to the client 109. Otherwise, the instruction service 123 proceeds to box 236. In box 236, the instruction service 123 generates the appropriate instructions 166 (FIG. 1) based upon the instruction rules 165, where the instructions 166 facilitate the requested action for the entity. In order to determine the relevant instruction rules 165 from which the instructions 166 are generated, the instruction service 123 may examine the size of the file 143, the type of file 143, and other information as can be appreciated. For example, if the requested action is to store a file 143 in the mass storage system 139 (FIG. 1), then certain instruction rules 165 may be implicated depending on the file size in generating the instructions 166 are to be used depending on whether the file 143 needs to be sliced. The instructions 166 generated may be any instructions 166 described herein or other instructions.

Also, in box 236, the instruction service 123 generates one or more time limited signed URI(s) (or one-time use URI(s), etc.) to be sent to the client 109 to implement the requested action if needed. If the action involves accessing files 143 already stored in the mass storage service 139, then the URI(s) may be the actual locations of the files 143 in the mass storage 113. Where files 143 are to be stored, the URI(s) will indicate the locations at which such files 143 are to be stored in the mass storage system 139.

In box 239, if necessary, the instructions 166, URI(s), encryption information, compression information, slice size and other information used to implement the requested action are stored in the bucket storage data 163. This may be necessary, for example, where the action involves the transfer of the file 143 or component files from the client 109 to the mass storage system 139 to be stored in the mass storage 113. In such case, this is done to as to facilitate future access to the files 143 or component files. Such information is stored in the bucket storage data 163 in association with the filename or other information relating to the file 143 or component files so that the file 143 or component files may ultimately be accessed at a later time from the mass storage 113.

Thereafter, in box 243, the instruction service 123 is configured to transmit the data 246 including the instructions 226 and other information such as encryption keys, the time limited signed URI(s), and any other applicable information to the instruction executor 173 in the client 109. In box 249, the instruction executor 173 implements the instructions 166 to perform the requested action. For example, where the action is to transfer the file for storage in the mass storage system 139, the instruction executor 173 will implement the instructions that cause the client 109 to perform such actions resulting in the transfer the file 143 from the client 109 to the mass storage system 139. Such instructions 166 may direct the slicing of the file 143 into component files, the encryption of the file 143 or component files, the compression of the file 143 or component files, and/or other actions as described above.

Also, in box 249, the instruction executor 173 generates and sends one or more requests 253 associated with the originally requested action to the storage application 136 as directed by the instructions 166 executed. For example, if the requested action is a put action to store a file 143 in the mass storage system 139, then the request 253 may include the file 143 (or reference on a network where the file 143 may be obtained) and the time limited signed URI received from the instruction service 123 as well as any other pertinent information.

In box 256, the storage application 136 actions upon the received request(s) and confirms that the time limited, signed URIs are still valid. This may be done, for example, by consulting appropriate data in the data store 133 indicating when authorization for the action was first issued by the instruction service 123. In box 259, if the time limited, signed URI for a given request 253 is invalid, then the storage application 136 issues a denial of service 263.

Otherwise, in box 266, the storage application 136 implements the desired action. For example, the storage application 136 may store a file 143 to, or get a file 143 from, a namespace 313 of a respective bucket 146. Also, the action may involve deleting, deprecating, or overwriting a file 143 stored in a namespace 313 of a given bucket 146. Once the storage application 136 implements the respective action in box 266, then in box 269, the storage application 136 proceeds to send a reply or confirmation 173 to the client 109 indicating whether the action was successfully implemented.

For example, each confirmation 273 is sent to the instruction executor 173 of the client 109 to inform the client 109 that the storage of a file 143 or component file was successful. This is important in that it may be possible that, due to network outages and/or other anomalies, the transfer of the file 143 or component file to the mass storage system 139 may be interrupted, thereby requiring that the file 143 or component file be resent. Thereafter, the flow diagram of FIGS. 3A and 3B ends as shown.

Figure 5:
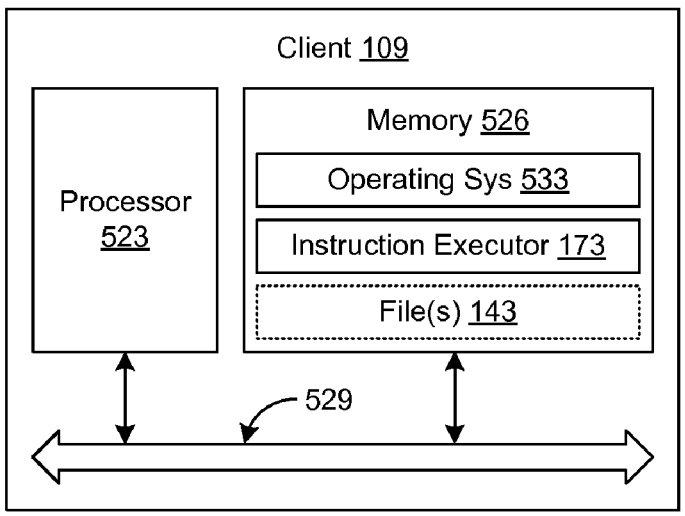
FIG. 5 is a schematic block diagram of one embodiment of a client employed in the file transfer and storage network of FIG. 1 according to an embodiment of the present disclosure.

Referring next to FIG. 5, shown is a schematic block diagram of one example of a server 103 according to an embodiment of the present disclosure. The server 103 includes a processor circuit, for example, having a processor 503 and a memory 506, both of which are coupled to a local interface 509. To this end, the server 103 may comprise, for example, a server computer with such structure. The local interface 509 may comprise, for example, a data bus with an accompanying address/control bus as can be appreciated.

Stored in the memory 506 are several components that are executable by the processor 503 or that are stored within the memory 506. In particular, stored in the memory 506 are a server operating system 513, the instruction service 123, and the storage application 136. It is understood that there may be other applications that are stored in the memory 506 and are executable by the processor 503 as can be appreciated. In addition, stored in the memory 506 is the data store 133 that includes the bucket policies 53 as described above. According to one embodiment, the data store 133 may comprise, for example, a database or other appropriate data structure.

Referring next to FIG. 6, shown is one example of a client 109 according to an embodiment of the present disclosure. The client 109 includes a processor circuit that comprises, for example, a processor 523 and a memory 526, both of which are coupled to a local interface 529. To this end, the local interface 529 may comprise, for example, a data bus with an accompanying address/control bus as can be appreciated.

Stored on the memory 526 and executable by the processor 523 are the operating system 533 and the instruction executor 173. Also, one or more files 143 may be stored in the memory 526 or otherwise may be accessible to the client 109.

Figure 4:
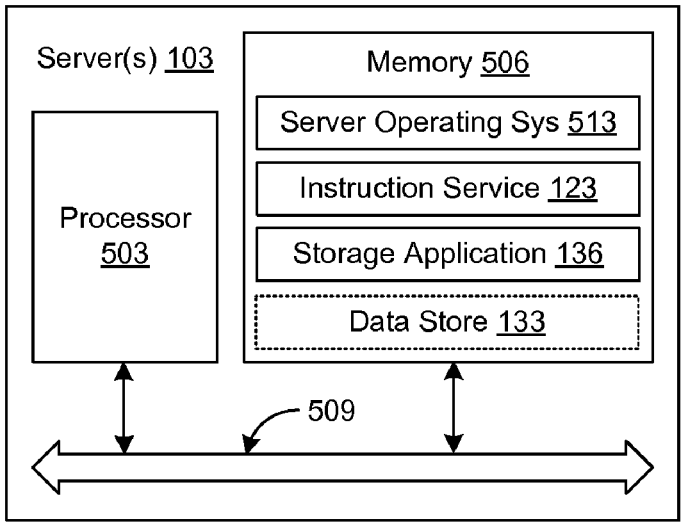
FIG. 4 is a schematic block diagram of one embodiment of a server employed in the file transfer and storage network of FIG. 1 according to an embodiment of the present disclosure.

With reference to FIGS. 4 and 5, a number of software components are stored in the memories 506/526 and are executable by the respective processors 503/523. In this respect, the term "executable" means a program file that is in a form that can ultimately be run by the processors 503/523. Examples of executable programs may be, for example, a compiled program that can be translated into machine code in a format that can be loaded into a random access portion of the memories 506/526 and run by the respective processors 503/523, or source code that may be expressed in proper format such as object code that is capable of being loaded into a of random access portion of the memories 506/526 and executed by the respective processors 503/523, etc. An executable program may be stored in any portion or component of the memories 506/526 including, for example, random access memory, read-only memory, a hard drive, compact disk (CD), floppy disk, or other memory components.

Each of the memories 506/526 is defined herein as both volatile and nonvolatile memory and data storage components. Volatile components are those that do not retain data values upon loss of power. Nonvolatile components are those that retain data upon a loss of power. Thus, each of the memories 506/526 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 503/523 may represent multiple processors and each of the memories 506/526 may represent multiple memories that operate in parallel processing circuits, respectively. In such a case, each of the local interfaces 509/529 may be an appropriate network that facilitates communication between any two of the multiple processors, between any processor and any of the memories, or between any two of the memories, etc. The processors 503/523 may be of electrical or of some other construction as can be appreciated by those with ordinary skill in the art.

The operating systems 513/533 are executed to control the allocation and usage of hardware resources such as the memory, processing time and peripheral devices in the server/client. In this manner, the operating systems 513/533 serve as the foundation on which applications depend as is generally known by those with ordinary skill in the art.

In addition, the functionality of the executable components indicated above may be expressed in any one of a number of programming languages such as, for example, C, C++, JAVA, or other programming languages.

Although the instruction service 123, storage application 136, instruction executor 173 and any other executable components of the present disclosure are described above as being embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates or other components, etc. Such technologies are generally well known by those skilled in the art and, consequently, are not described in detail herein.

The block diagrams and/or flow diagrams of FIGS. 1-3B show the architecture, functionality, and operation of an implementation of the instruction service 123, storage application 136, instruction executor 173 and any other executable components of the present disclosure. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow diagrams of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the instruction service 123, storage application 136, instruction executor 173 and any other executable components described above comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the instruction service 123, storage application 136, instruction executor 173 and any other executable components described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a server;
a mass storage system maintaining a plurality of buckets, each of the buckets being employed to store at least one data file;
wherein the server is operable to:
   facilitate a use of the buckets by a plurality of entities using a plurality of clients for the storage of a plurality of files over a public network; and
   restrict the use of one of the buckets by one of the entities to a namespace;
   authenticate the one of the entities before facilitating the use of one of the buckets by the one of the entities;
   restrict the use by the one of the entities of the namespace of the one of the buckets to a limited period of time;
a data store associated with the server, the data store maintaining a first association between the one of the buckets and the namespace in a data store, and the data store maintaining a second association between the one of the entities and the namespace in the data store, where the second association indicates the namespace to which the one of the entities is restricted; and
a permission maintained in the data store, the permission governing the use of the one of the buckets by the one of the entities.

2. The system of claim 1, where the permission indicates whether the one of the entities is allowed to perform one of putting one of the files into the namespace of the one of the buckets, getting one of the files from the namespace of the one of the buckets, and deleting one of the files from the namespace of the one of the buckets.

3. The system of claim 1, where the server is further operable to restrict the use by the one of the entities of the namespace of the one of the buckets to the limited period of time by being further operable to generate a signed universal resource indication (URI) that facilitates use of the namespace of the one of the buckets for the one of the entities, where the signed URI is valid for a predefined period of time.

4. A method, comprising the steps of:
maintaining a plurality of buckets in mass storage system, each of the buckets being employed to store at least one data file;
facilitating, in a server, a use of the buckets by a plurality of entities using of a plurality of clients for the storage of a plurality of files over a network;
receiving a request for use, by one of the entities, of one of the files, the request including a credential identifying one of the entities;
determining, based on the credential, which of the buckets corresponds to the requested one of the files; and
restricting the requested use of the determined one of the buckets to one of a plurality of namespaces for which the requesting one of the entities is granted permission.

5. The method of claim 4, wherein the step of restricting the requested use of one of the buckets by one of the entities to the namespace further comprises the steps of:
- maintaining a first association between the one of the buckets and the namespace in a data store; and
- maintaining a second association between the one of the entities and the namespace in the data store, where the second association indicates the namespace to which the one of the entities is restricted.

6. The method of claim 4, further comprising the step of authenticating the one of the entities in the server before facilitating the use of one of the buckets by the one of the entities.

7. The method of claim 1, further comprising the step of using the permission to indicate whether the one of the entities is allowed to perform one of putting a file in the namespace of the one of the buckets, getting one of the files from the namespace of the one of the buckets, and deleting one of the files from the namespace of the one of the buckets.

8. The method of claim 4, where the step of restricting the requested use of the one of the buckets by one of the entities to the namespace restricts for a limited period of time.

9. The method of claim 8, where the step of restricting the requested use of the one of the buckets to one of the entities to the namespace the limited period of time further comprises the step of generating, in the server, a signed universal resource indication (URI) that facilitates use of the namespace of the one of the buckets for the one of the entities, where the signed URI is valid for a predefined period of time.

10. A system, comprising:
- a server;
- a mass storage system maintaining a plurality of buckets, each of the buckets being employed to store at least one data file;
- a data store associated with the server;
- in wherein the server, is operable to:
  - receive a plurality of requests for a use of the buckets by a plurality of entities using a plurality of clients for the storage of a plurality of files over a network, each request including a certificate identifying one of the entities;
  - use the certificate to identify one of the buckets; and
  - restrict the use of the identified one of the buckets by the identified one of the entities to one of a plurality of namespaces based on a permission, maintained in the data store, that governs the use of the one of the identified buckets by the one of the identified entities.

11. The system of claim 10, where the network is a public network.

12. The system of claim 10, the data store operable to maintain a first association between the identified one of the buckets and the one of the namespaces in the data store and to maintain a second association between the identified one of the entities and the one of the namespaces in the data store, where the second association indicates the one of the namespaces to which the identified one of the entities is restricted.

13. The system of claim 10, wherein the server is further operable to authenticate the identified one of the entities before responding to one of the requests for the use of one of the buckets by the identified one of the entities.

14. The system of claim 10, where the permission indicates whether the identified one of the entities is allowed to put a file in the namespace of the one of the buckets.

15. The system of claim 10, where the permission indicates whether the identified one of the entities is allowed to get a file from the namespace of the one of the buckets.

16. The system of claim 10, where the permission indicates whether the identified one of the entities is allowed to delete a file from the namespace of the one of the buckets.

17. The system of claim 10, where the server is further operable to restrict the use by the identified one of the entities of the namespace of the one of the buckets to a limited period of time.

18. The system of claim 17, where the server is further operable to restrict the requested use of the one of the buckets to the limited period of time by being further operable to a signed universal resource indication (URI) that facilitates use of the namespace of the one of the buckets for the identified one of the entities, where the signed URI is valid for a predefined period of time.

19. The method of claim 4, wherein the credential comprises a certificate.

20. The method of claim 4, wherein the restricting step comprises the steps of:
- determining whether the credential in the received request is listed in a policy associated with the determined bucket; and
- denying the requested use when the credential in the received request is not listed in the policy.

21. The method of claim 20, wherein the restricting step further comprises the step of, verifying, in response to the credential in the received request being listed in the policy, the requested use based on a permission associated with the determined bucket.

22. The system of claim 10, wherein the server is further operable to restrict by being further operable to:
- determine whether the certificate in the received request is listed in a policy associated with the identified bucket; and
- deny the requested use when the credential in the received request is not listed in the policy.

23. The system of claim 22, wherein the wherein the server is further operable to restrict by being further operable to:
- in response to the credential in the received request being listed in the policy, verify the requested use based on the permission.

* * * * *